United States Patent [19]

Smith et al.

[11] 4,242,400

[45] Dec. 30, 1980

[54] MAGNETICALLY STRUCTURED MATERIALS

[75] Inventors: Andrew L. Smith, London; Paul E. Claes, Hayes, both of England

[73] Assignee: E M I Limited, Hayes, England

[21] Appl. No.: 948,497

[22] Filed: Oct. 4, 1978

[30] Foreign Application Priority Data

Oct. 15, 1977 [GB] United Kingdom ............... 42970/77

[51] Int. Cl.$^3$ ............................................... B32B 3/00

[52] U.S. Cl. .................................... 428/201; 156/239; 156/249; 427/48; 427/131; 428/202

[58] Field of Search ........................... 427/47, 48, 131; 428/201; 156/239, 249

[56] References Cited

U.S. PATENT DOCUMENTS

| | | | |
|---|---|---|---|
| 3,111,422 | 11/1963 | Newman et al. | 427/131 |
| 4,081,132 | 3/1978 | Pearce | 427/48 |

FOREIGN PATENT DOCUMENTS

| | | |
|---|---|---|
| 1273382 | 5/1972 | United Kingdom . |
| 1334141 | 10/1973 | United Kingdom . |

*Primary Examiner*—Bernard D. Pianalto
*Attorney, Agent, or Firm*—Fleit & Jacobson

[57] ABSTRACT

Production of a magnetically and visibly detectable two-layer structure by coating a first layer including a binder with a visibly distinct magnetic material in a dispersion comprising a partial solvent for the binder and selectively applying a magnetic field to cause the magnetic material to migrate into the first layer.

20 Claims, 3 Drawing Figures

MAGNETICALLY STRUCTURED MATERIALS

Figure 1:
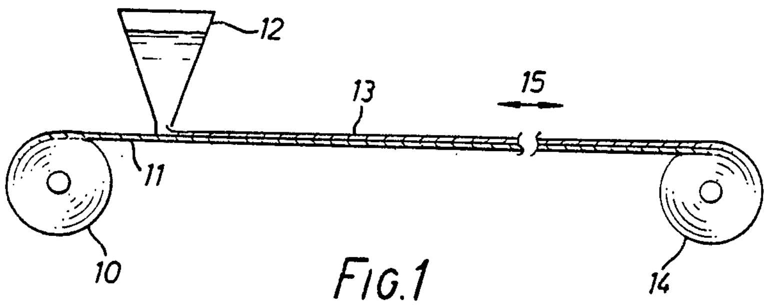

This invention relates to the production of a member having a magnetically and visibly detectable structure. By a visibly detectable structure we mean, primarily a structure detectable by the unaided eye, but may also include structures detectable by apparatus sensitive to infra red, ultra violet, etc. radiation.

Magnetically structured materials have been proposed (United Kingdom Pat. No. 1331604 and DT OS No. 2055357 published May 27, 1971) which have been made by the action of a magnetic field on a layer of liquid dispersion of gamma iron oxide, the dispersion subsequently setting to fix the structure against alteration without damage to the set dispersion. This method of production is quite satisfactory where relatively large areas of material in tape form are required as manufacture is carried out on slightly modified web-coating machines used for conventional recording tape manufacture.

However, the magnetic structure is not easily visible nor is small quantity production possible very economically.

It is an object of the invention to provide a technique for the production of magnetically structured material with a visible representation of the structure.

Such materials are particularly, but not exclusively, suitable as security elements, e.g. for passports, identity, credit and pass cards, and keys and other secure documents.

According to the invention, there is provided a method of producing a member having a magnetically and, as hereinbefore described, visibly detectable structure including, providing on a support a first layer of a first material held dispersed in a first binder which has been dried but is still softenable without damage, providing a supply of a coating liquid of a second, magnetisable, material, visibly distinct from the first material and dispersed in a second binder and a solvent therefor, which solvent is also a partial solvent for the first binder, applying the coating liquid over the first layer to form a second layer, subjecting the two layers, in selected spaced regions thereof, to a magnetic field having a field gradient across the layers sufficient to cause magnetisable particles of the second material to enter the body of the first layer and mix with the first material, freed from the hold of the first binder by said partial solvent, to impart to said layer a visibly detectable structure, causing or permitting the dispersion to dry to hold the first and second materials in their respective positions.

The first material may be a pigment or a dye. Some suitable inorganic pigments are lead chromate, titanium dioxide, hydrated aluminum sulphate, bismuth metal, hydrated zinc sulphate, mercuric oxide (red) or cadmium oxide.

The first layer should be thick enough to make visible detection practicable. If, for example, the first layer is pigmented, it should be sufficiently opaque to give good opacity. It should also be sufficiently thin to allow the second material to migrate into the first layer under the influence of practicable magnetic fields. Normally a thickness of 1–5 microns is preferred and a thickness of 2–3 microns is particularly useful.

The magnetisable particles may be capable of alignment along a selected direction by a magnetic field, suitable examples of such magnetisable particles being chromium dioxide (($CrO_2$), magnetite ($Fe_3O_4$) or $\gamma$ ferric oxide ($Fe_2O_3$). The magnetic field may be applied in pulses to orient the particles of the magnetisable material along a first predetermined direction. Prior to the application of this magnetic field, a uniform preliminary magnetic field may be applied to orient the particles in a second predetermined direction substantially different from the first predetermined direction. The first and second predetermined directions may be substantially orthogonal.

It is important that the combination of the first and the second materials should provide good colour contrast and particularly useful combinations are titanium dioxide with chromium dioxide, or lead chromate with chromium dioxide, or lead chromate with black magnetite. By substituting gamma ferric oxide from chromium dioxide in the procedure of Examples I and II below, further useful combinations of materials may be produced.

The magnetisable material may be dispersed in a suitable plastics resin binder and a solvent therefor comprising a partial solvent for the binder of the first material, said partial solvent being sufficiently effective to soften the binder of the first material to allow the magnetisable particles to enter the first layer but not effective to completely dissolve the first layer in the absence of a magnetic field.

The first material may be dried by unassisted evaporation of the solvent in air.

The member may be heated or otherwise treated to cause the dried dispersion to cure to become insoluble in the solvents.

The first material may be supported on a flexible plastics web. A suitable example of such a plastics web is a polyester film, e.g. MELINEX (RTM) polyethylene terephthalate film. This film may be transparent.

The magnetisable material member may be transferred from the plastics web to a stiffer support by a hot blocking process, to form a security card document, or the like items, so that the first layer overlays the second layer on the card.

Figure 2:
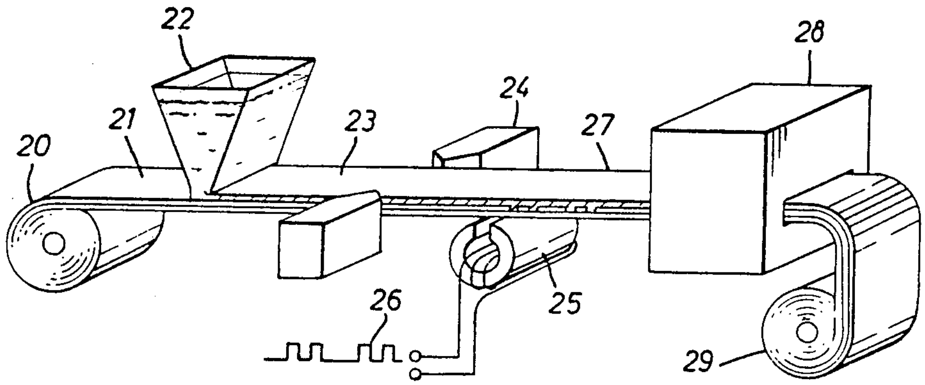
Figure 3:
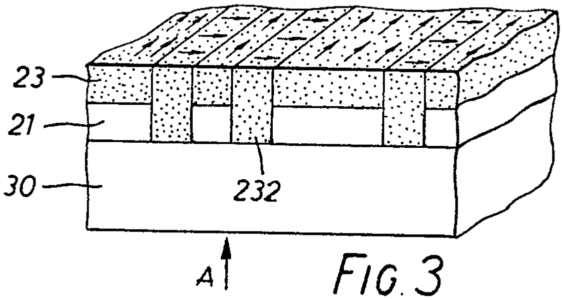

Embodiments of the invention will be described with reference to the accompanying drawings in which FIG. 1 shows the application of a first material to a support web, FIG. 2 shows the coating of the first material when on the support web, and FIG. 3 shows a portion of a coated medium produced in accordance with the invention.

The invention is described with reference to magnetisable material member in the form of an elongated medium, e.g. a length of tape or a strip or a pocketable plastics card.

A first stage of production of such a medium is to coat a web of plastics such as a polyester film, e.g. MELINEX (RTM) with a dispersion of a dye in a binder made fluid by a solvent and allow the dispersion to dry. FIG. 1 shows such a stage. A roll 10 supplies a plastics web 11 which is passed beneath a trough coater 12, of suitable form, to deposit a layer 13 of a dried thickness of some 1 to 3 microns. The web with the dried coating is then rolled up, 14. The trough 12 is supplied with a liquid containing a first material of a pigment, a binder therefor and a solvent. The solvent evaporates, leaving the material dispersed among the binder, before the coated web is rolled. A suitable length, 15, of coated web is provided between the trough 12 and roll 14 to allow the evaporation, unassisted, of the solvent into the atmosphere. Heat may be applied provided this will not cause the coating to harden irreversibly.

At a suitable time after the production of coated roll 14 a further coating is applied. The time which elapses may be a few minutes or hours or several months. FIG. 2 shows this stage of the process. A roll 20, which may be roll 14 or a part thereof, of a web coated with a first material, such as a pigment, dispersed in a binder which has been dried but is softenable, 21, is used to feed coated web 24 beneath a trough coater 22. (Clearly other suitable coaters may be used). The trough coater contains a liquid which is a dispersion of second, magnetisable, material particles visibly distinct from the first material in a binder made liquid by a solvent which is also effective as a partial solvent for the dried coating of web 21. The liquid from the trough applies a uniform coat 23 of some 50 microns wet thickness on the dried coating. The coat 23 remains mobile until a dryer 28 is reached. The mobile coat 23 may be subjected to a uniform, preliminary, magnetic field, from pole pieces 24, which is directed across the web movement direction. This aligns the magnetisable material particles substantially across the web.

A controlled magnetic field may be applied from device 25, which may be a magnetic recording head, selectively energisable to exert a magnetic field along the web direction.

The field from device 25 has two interlinked actions. It aligns magnetisable material particles along the web direction where the field is exerted. However, it also causes the coat 23 to penetrate the dried coat 21. This is indicated at 27 and in more detail in FIG. 3. The previously dried coat, 21, on the support is penetrated by the now applied liquid coat 23, as at 232, so that each coat, in turn, along the tape length is present at the support, 30. It will be recalled that the materials in coats 21 and 23 are visibly distinct. Accordingly, when viewed in direction "A", FIG. 3, through the transparent support 30, a pattern of the two materials will be seen. This pattern is the same as the pattern of orientations of the magnetisable particles produced by the selective application of the controlled field from device 25. Clearly, device 25 will produce a pattern of materials and orientations whether or not the preliminary field from pole pieces 2 exists. The pattern from device 25 can be of any desired form.

A plurality of magnetic fields may be applied in combination across the two layers in selected spaced regions thereof. An example of such an application is a multitrack arrangement which can be used to produce visibly and magnetically detectable alpha numeric characters on a 7×5 element basis.

In the description so far, the materials used have been referred to in general terms. Three examples now follow, using specific exemplary, but not limiting, constituents to illustrate the characteristics needed.

EXAMPLE 1

Two dispersions, A and B, are prepared. Dispersion A: 57% (solids by weight) of commercial $TiO_2$ (TIOXIDE R-TC2 (R.T.M.)) stirred into a solution of commercial ethyl methacrylate copolymer (Rhom and Haas Paraloid B72 (R.T.M.) as a binder, in a hydrocarbon (toluene) solvent.

Sufficient solvent is used to produce a dilution suitable for trough coating (or other technique if this is preferred) of the dispersion onto a plastics film.

Dispersion B: 80% (solids by weight) of chromium dioxide in a binder consisting of ethyl methacrylate copolymer (PARALOID B72) (RTM) as above), methyl methacrylate copolymer (PARALOID B99 (RTM)) and minor additives including a flow agent (Monsanto-MODAFLOW (RTM)) and surfactants. The mixture is ball-milled for 16 hours in a ketone/hydrocarbon solvent (including m.e.k, m.i.b.k. and toluene).

The prepared dispersion A is trough-coated onto a 25 micron web of polyester plastics film (MELINEX (RTM)). The coating is applied to produce an approximately 2 to 3 micron air-dried thickness of $TiO_2$ in binder, (FIG. 1). The dried coated web has a coating of dispersion B applied to a wet thickness of some 50 microns. (FIG. 2). While the wet coating is still fluid the particle aligning, or orienting, processes described above are carried out, e.g. transversely and through the web. The pattern produced, e.g. by device 25 of FIG. 2, can be of a wide range of forms. Flux reversals of 100 per inch of web have been applied, as well as a flux sustained for ½ inch of web travel, and these have produced corresponding magnetic structures and colour patterns, of black chromium dioxide showing against the white $TiO_2$ through the transparent web. The coloured forms can include alpha numeric characters or other shapes and symbols as well as bar patterns.

EXAMPLE II

Two dispersions, C and D, are prepared.

Dispersion C: 78% (solids by weight) of commercial lead chromate (HORNA-GL35 (RTM) yellow) in a mixture of an hydrolysed polyvinyl chloride/acetate and saturated linear polyester resins (Union Carbide VAGM (RTM) with Goodyear VITEL PE22 (RTM) in a 4:1 ratio, ball-milled for 16 hours in a ketone/hydrocarbon mix.

Dispersion D: 78% (solids by weight) of chromium dioxide in a saturated polyester-urethane resin plus a vinylidene chloride-acrylonitrile copolymer binder together with minor additives including a flow agent (Monsanto-MODAFLOW (RTM)) and surfactants, ball-milled for 21 hours in a ketone/hydrocarbon mix.

The dispersions are used as described in Example I, with dispersion C coated and dried before dispersion D is applied.

EXAMPLE III.

Two dispersions, E and F, are prepared:

Dispersion E: 75% (solids by weight) of black magnetite commercially produced coated with a dispersion aid (Hercules X 3466—now replaced by X 3525 (RTM)) in a binder consisting of methyl methacrylate copolymers and ethyl methacrylate copolymers (PARALOID B99 and B72 (RTM)) in a hydrocarbon solvent dispersed in 15 minutes using a high shear dissolver equipment.

Dispersion F: 75% (solids by weight) of lead chromate (HORNA-GL35 yellow, (RTM)) in a binder as in dispersion E.

The dispersions are used as described in Example I, with dispersion F coated and dried before dispersion E is applied.

The above examples indicate dispersions by which colour patterns corresponding to a magnetic structure can be produced. Clearly, other dispersions may be formulated. General guidance as to the nature of suitable dispersions will be apparent to those skilled in the art from the examples. The following points are apparently significant, although the precise theory is not understood. In the absence of the magnetic field from device 25 the second, fluid, coating does not attack the already dried layer to any significant extent. It is desirable that the dried layer does not flocculate or gel when the fluid lay is applied, but should be partially softened to permit the magnetisable material to penetrate, probably by partial dissolution rather than capillarity. It is believed that the coloured material is not displaced. Too powerful a solvent, or too easily dissolved binder resin will not produce good results. The colour (pigment) in the dried layer should have a high opacity and colour strength. Organic pigments, although of lower mass, have lower hiding power and have not proved as effective as inorganic ones. The magnetisable pigment should be adequately opaque to blot out the colour pigment when mixed with it.

The dispersion for the dried layer does not have a very critical physical form, provided a thin, even, dried coating can be produced. This dispersion can be made by ball-milling for some hours, or using high-shear dissolver equipment, in as little as 15 minutes.

The dispersion for the magnetisable material is also conventional, with a viscosity, preferably in the 20 to 80 centipoise range, and is typically a dispersion suitable for single layer coating but of a solvent appropriate to the dried layer binder. This dispersion can also be produced by a shear dissolver. Water-based dispersions may be usable. The layer thicknesses, especially of the magnetisable material, are not restricted, other than by the selected coating process.

A particular advantage of the described process is that the first dried coating can be applied well before the magnetisable coating, even several months, say 6, is possible. Alternatively, the dried layer can be prepared from high stability or quickly prepared pigments. Similarly, a high-stability or quickly mixed ("stir-in") magnetisable dispersion can be used. This means that one or both layers can be applied at remote points, e.g. passport or visa issuing stations, without difficulty, and the result is visible. The coatings should adhere to each other. The patterned material can be applied to a document, etc. as a security element e.g. by hot stamping or other method of transfer from the support web. The magnetic fields required are similar to those used in conventional recording techniques, easing manufacture.

The dried coating can be stored and handled without great care being required and the production speed can be high if required while the magnetisable coating can be supplied at slow speed. The binders may be formulated so that when the pattern is made the binders can be cured to prevent alteration.

The techniques described above permit the production of a patterned structure whose pattern is both magnetically and visibly (light, i.r., U.V. etc.) detectable and is the same in both types. A particular advantage is that small-scale unskilled production of a security element whose security is provided by the magnetic structure and material is practicable using a relatively simple piece of equipment.

What we claim is:

1. A method of producing a member having a magnetically and (as hereinbefore described) visibly detectable structure including, providing on a support a first layer of a first material held dispersed in a first binder which has been dried but is still softenable without damage, providing a supply of a coating liquid of a second, magnetisable, material, visibly distinct from the first material and dispersed in a second binder and a solvent therefor, which solvent also comprises a partial solvent for the first binder, applying the coating liquid over the first layer to form a second layer, subjecting the two layers, in selected spaced regions thereof, to a magnetic field having a field gradient across the layers sufficient to cause magnetisable particles of the second material to enter the body of the first layer and mix with the first material, freed from the hold of the first binder by said partial solvent to impart to said first layer a magnetically and visibly detectable structure, causing or permitting the dispersion to dry to hold the first and second materials in their respective positions.

2. A method of producing a member according to claim 1 in which the first material is a pigment or a dye.

3. A method of producing a member according to claim 2 in which the pigment is inorganic.

4. A method of producing a member according to claim 3 in which the pigment is lead chromate or titanium dioxide.

5. A method according to claim 1 in which the first layer has a thickness of between 1 and 5 microns.

6. A method according to claim 5 in which the first layer has a thickness of between 2 and 3 microns.

7. A method according to claim 1 in which the magnetisable particles of the second material are capable of alignment, by a magnetic field, along a selected direction.

8. A method according to claim 7 in which the magnetisable material comprises particles of chromium dioxide or gamma ferric oxide or black magnetite.

9. A method according to claim 7 in which the magnetic field applied in the selected spaced regions also aligns the particles of the magnetisable material in a first predetermined direction.

10. A method according to claim 9 in which prior to the application of the magnetic field a uniform preliminary magnetic field is applied to align the magnetisable particles in a second predetermined direction substantially different from the first predetermined direction.

11. A method according to claim 10 in which the first predetermined direction and the second predetermined direction are substantially orthogonal.

12. A method according to claim 1 in which the first material is titanium dioxide and the second, magnetisable, material is chromium dioxide.

13. A method according to claim 1 in which the first material is lead chromate and the second, magnetisable, material is chromium dioxide.

14. A method according to claim 1 in which the first material is lead chromate and the second, magnetisable, material is black magnetite.

15. A method according to claim 1 in which the first material is dried by unassisted evaporation of the solvent in air.

16. A method according to claim 1 in which the member is heated or otherwise treated to cause the dried dispersion to cure to become insoluble in the solvents.

17. A method according to claim 1 in which the first material is supported on a flexible plastics web.

18. A method according to claim 1 including applying, in selected spaced regions, across the two layers a plurality of magnetic fields used in combination to produce visibly and magnetically detectable alpha numeric characters.

19. A magnetisable material member produced by a method according to claim 1.

20. A security card, or document, or like items formed by transferring the magnetisable material member according to claim 19 to a stiffer support by a hot blocking process so that the said first layer overlays the second layer on the card document or like items.

* * * * *